(No Model.) 2 Sheets—Sheet 1.

S. H. BROWN & J. E. SOLT.
CORN HARVESTER.

No. 498,409. Patented May 30, 1893.

Witnesses
G. F. Downing
S. G. Nottingham

Inventors
J. E. Solt and
S. H. Brown
By H. A. Seymour
Attorney (No Model.) 2 Sheets—Sheet 2.

S. H. BROWN & J. E. SOLT.
CORN HARVESTER.

No. 498,409. Patented May 30, 1893.

Witnesses
G. F. Downing
S. G. Nottingham

Inventors
J. E. Solt and
S. H. Brown
By H. A. Seymour
Attorney

UNITED STATES PATENT OFFICE.

SAMUEL H. BROWN, OF FREDERICK, MARYLAND, AND JAMES E. SOLT, OF NORTHBROOK, PENNSYLVANIA; SAID SOLT ASSIGNOR TO SAID BROWN.

CORN-HARVESTER.

SPECIFICATION forming part of Letters Patent No. 498,409, dated May 30, 1893.

Application filed November 3, 1891. Serial No. 410,753. (No model.)

*To all whom it may concern:*

Be it known that we, SAMUEL H. BROWN, of Frederick city, in the county of Frederick and State of Maryland, and JAMES E. SOLT, of Northbrook, in the county of Chester and State of Pennsylvania, have invented certain new and useful Improvements in Corn-Harvesters; and we do hereby declare the following to be a full, clear, and exact description of the invention, such as will enable others skilled in the art to which it appertains to make and use the same.

Our invention relates to an improvement in corn harvesters, and more particularly to certain novel apparatus for depositing the corn sheaves upright on the ground.

To this end the invention consists in a frame, in combination with a deck revoluble in the direction in which the harvester travels whereby stalks falling thereon are deposited endwise or butt downward upon the ground.

It further consists in certain novel features of construction and combinations of parts as will be hereinafter described and pointed out in the claims.

Figure 1:
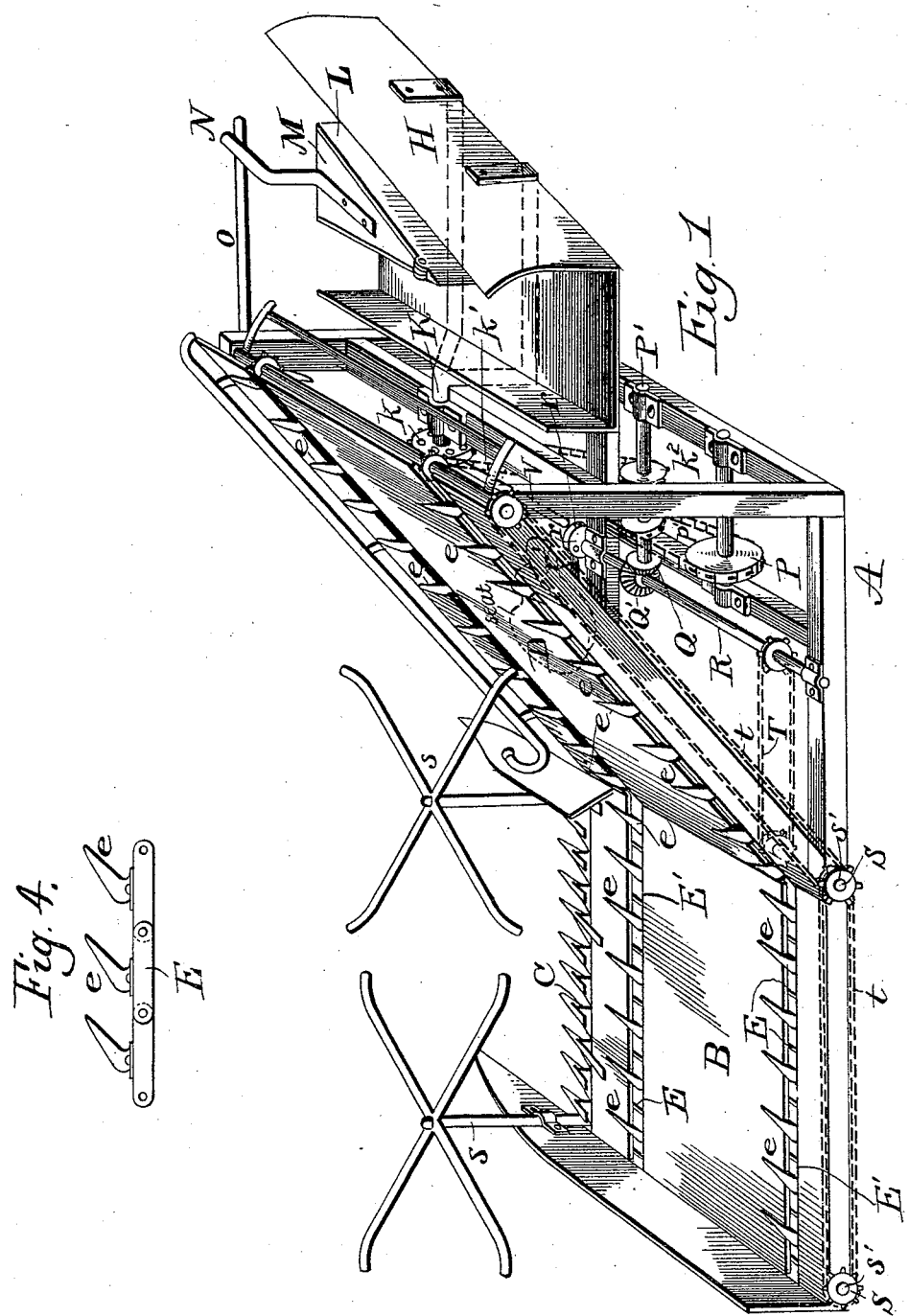
Figure 2:
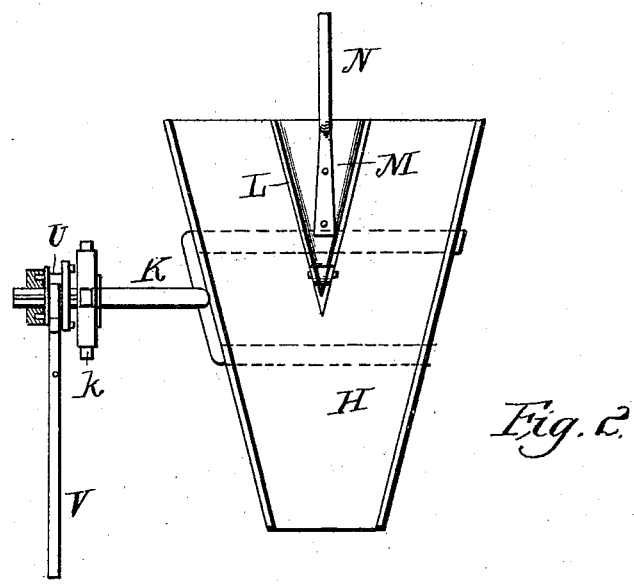
Figure 3:
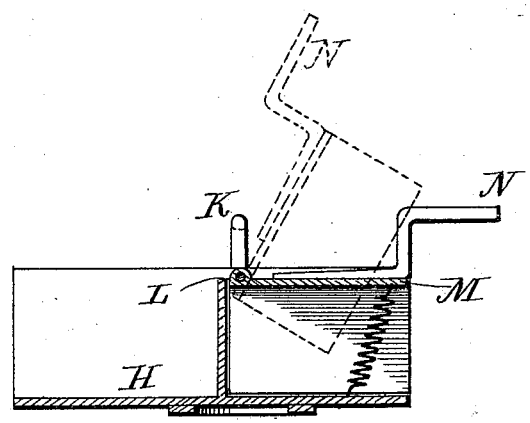

In the accompanying drawings: Figure 1 is a rear perspective of a harvester with our improved apparatus attached. Fig. 2 is a plan view of the deck showing the wedge M and also means for rotating and locking the deck. Fig. 3 is a vertical section through the deck and block, and Fig. 4 is a detail showing three links of chain E.

A represents the frame of the harvester, B the table or platform on which the stalks drop as they are cut by the knives C. On this table or platform, and up the inclining side D, the endless chains E, E, travel, these chains passing beneath the narrow slots E′, E′, formed in the platform. These slots are a trifle narrower than the chains and they are provided with inwardly inclining teeth e, e which project upwardly through the slots, and carry forward the stalks as they drop over on the platform. By this construction, guide pulleys or rollers for the endless carrier chains e are dispensed with and rendered unnecessary.

The most essential feature of our invention consists in the deck into which the corn stalks are dropped from the carrier chains. This consists of a scoop or A-shaped deck H supported to one side of the frame on a shaft K. The object of the peculiar shape given the deck is to make it conform as nearly as possible to the natural shape of the sheaf. The position and length of the sheaf may be such, if desired, that the tassel ends of the corn may extend out of the smaller end of the deck where it is convenient for an operator standing behind it, to tie a band around the sheaf.

At the opposite or larger end of the scoop or A-shaped deck, means is located for spreading the butt end of sheave. This consists of a stationary V-shaped block L stationed in the larger end of the deck. The outer edges of this block are approximately parallel with the sides of the deck. The stalks as they are dropped in the deck are divided at their butt ends by the block, they arranging themselves on both sides of the block. This block being hollow, a similar shaped hollow wedge M is hinged therein at its inner point, it being adapted to close the block when in its normal position. This wedge is provided with a goose neck N projecting upward from the outer end of the wedge M. This goose neck projects upward far enough to always extend above the stalks when piled in the deck. Its outer end reaches forward far enough to strike a cross bar or trip O when the deck makes a revolution, whereby the wedge is raised to spread the bottom of the sheaves. Afterward it is made to resume its former position by a spring.

It will be understood that the block and wedge spread the butt end of the sheaf. The block spreads it in two directions and the wedge in a third so that the sheaf will stand upright when dropped on the ground.

Any suitable gearing for the purpose may be adapted for driving the cutter bar, the carrier chains and for revolving the deck at the desired interval. As the following is approved of, it will be described. On the axle a sprocket wheel P is secured. A drive shaft P′ parallel with the axle also has mounted upon it a sprocket wheel over which a sprocket chain p′ extending around wheel P, passes. This shaft P′ has a bevel gear wheel Q secured on its inner end and this wheel is intermeshed with a corresponding one Q' on the shaft R. The latter has a crank disk $r$ on its forward end and from the wrist pin thereon a pitman $r'$ extends to the cutter bar. A pair of longitudinal shafts S, S, extend forward to the rotary reels $s, s$, which they drive and these shafts are provided on their rear ends with sprocket wheels $s', s'$, over which drive chains $t, t$ pass. These shafts S, S are driven by a chain T from shaft R.

The mode adopted of operating the deck is as follows: A sprocket wheel $k$ is loosely mounted on the shaft K and this wheel is kept constantly in rotation by a drive chain $k'$ extending over a sprocket wheel $k^2$ on drive shaft P'. A clutch U is keyed to slide on the shaft K by a feather or other means and this clutch is shifted by means of hand lever V which extends back in position to be manipulated by the driver or operator from the seat. A convenient clutch is the one shown which consists of a disk with teeth thereon adapted to enter corresponding holes in the sprocket wheel $k$. In order to stop the rotation of the deck the disk is provided on its opposite face with teeth which are adapted to enter holes in the frame when the disk is thrown out of engagement with the wheel.

The operation is briefly as follows: The stalks are carried upward to the deck as fast as they are cut and when bound together into a sheaf, the lever is swung to clutch the sprocket wheel $k$ to its shaft. Then the deck is rotated, the sheaf sliding out of its forward end and being stood on end by the spreading of the butts. The deck continues to revolve turning over the top of the sheaf as it stands on the ground until it reaches its normal position, when it may be stopped by hand or tripped automatically.

Having fully described our invention, what we claim as new, and desire to secure by Letters Patent, is—

1. In a corn harvester, the combination with the main frame, of a deck revoluble in the direction in which the harvester travels whereby the stalks are deposited endwise or butt downward upon the ground, substantially as set forth.

2. The combination with a main frame, of a deck which revolves forward in the direction in which the harvester travels, and means connected with the deck for spreading the bottom of the sheaf formed on the deck, substantially as set forth.

3. The combination with a deck capable of being revolved forward and inverted, and means for stopping and starting the revolution of the deck, of a wedge connected with the deck for spreading the bottom of the sheaf simultaneously with the revolution of the deck, substantially as set forth.

4. The combination with a revoluble deck, of a wedge or block located at one end of the deck, and means for striking this wedge as the deck rotates to automatically throw it out of its normal position relative to the deck to spread one end of the sheaf, substantially as set forth.

5. The combination with a scoop or A-shaped deck, and means for rotating the latter periodically, of a hollow V-shaped block, a wedge hinged in the latter, and means adapted to strike the wedge when the deck revolves whereby it is raised and the bottom of the sheaf is spread simultaneously with the rotation of the deck, substantially as set forth.

6. The combination with a main frame, of a transverse revoluble shaft having a deck thereon which revolves in the direction in which the machine travels, of clutch mechanism on the shaft, and gearing for rotating the shaft at the will of the operator, substantially as set forth.

In testimony whereof we have signed this specification in the presence of two subscribing witnesses.

SAMUEL H. BROWN.
JAMES E. SOLT.

Witnesses to signature of Samuel H. Brown:
 IRA TYLER,
 J. V. SILANCE.
Witnesses to signature of James E. Solt:
 W. D. GREENE,
 C. X. ROYAL.